US006323411B1

(12) United States Patent
Fukata

(10) Patent No.: US 6,323,411 B1
(45) Date of Patent: Nov. 27, 2001

(54) APPARATUS AND METHOD FOR PRACTICING A MUSICAL INSTRUMENT USING CATEGORIZED PRACTICE PIECES OF MUSIC

(75) Inventor: Ayumi Fukata, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/356,727

(22) Filed: Jul. 20, 1999

(30) Foreign Application Priority Data

Jul. 21, 1998 (JP) .................................................. 10-221104

(51) Int. Cl.[7] .................................................. G09B 15/02
(52) U.S. Cl. .......................................... 84/477 R; 84/478
(58) Field of Search .................................... 84/477 R, 478

(56) References Cited

U.S. PATENT DOCUMENTS

| | | | |
|---|---|---|---|
| 5,183,398 | * | 2/1993 | Monte et al. ........................ 84/478 X |
| 5,288,941 | * | 2/1994 | Sekizuka ............................. 84/478 X |
| 5,393,927 | | 2/1995 | Aoki . |
| 5,604,322 | * | 2/1997 | Kikuchi ............................... 84/477 R |
| 5,723,803 | * | 3/1998 | Kurakake ......................... 84/477 R X |
| 5,728,960 | * | 3/1998 | Sitrick ................................ 84/477 R |
| 5,850,048 | * | 12/1998 | Ruf ................................ 84/477 R X |
| 5,907,115 | * | 5/1999 | Matsunaga et al. ................ 84/477 R |

FOREIGN PATENT DOCUMENTS 10-097249   4/1998   (JP) .

* cited by examiner

*Primary Examiner*—Stanley J. Witkowski
(74) *Attorney, Agent, or Firm*—Morrison & Foerster LLP

(57) ABSTRACT

When the student selects a music piece or tune, for example of an 8-beat rhythm, the display panel exhibits a plurality of rhythm study pieces of music of the 8-beat rhythm. Among the displayed plural pieces, the student selects a desired one arbitrarily, and then the apparatus displays a tablature, a musical notation suitable for the instrument, for example, the guitar, corresponding to the selected rhythm study piece. The tablature indicates, for example, the string and the fret positions to depress among the six strings of the guitar, together with the indication of the stroke direction by means of arrows or other marks at every manipulating timing. The student practices the guitar according to the displayed tablature and indications.

11 Claims, 6 Drawing Sheets

Interrupt Routine

APPARATUS AND METHOD FOR PRACTICING A MUSICAL INSTRUMENT USING CATEGORIZED PRACTICE PIECES OF MUSIC

BACKGROUND OF THE INVENTION

1. Field of the Invention

The present invention relates to a musical instrument practicing apparatus and method, and a machine readable medium containing program instructions for realizing such an apparatus and a method, and more particularly to an apparatus and a method suitable for practicing the guitar or the like musical instrument, in which a plurality of practice pieces of music are provided such that a desired one can be arbitrarily selected by the student and the musical score thereof is displayed together with instruction about the manner of manipulation on the instrument such as strokes against the strings and fret positions of the respective strings. The invention is applicable in various forms of electronic musical apparatuses such as an electronic musical instrument and a computer-system-configured music practicing apparatus.

2. Description of the Prior Art

Among the prior art apparatus for practicing a musical instrument such as a guitar, there has been a type which stores music piece data for automatic performances of plural pieces of music, renders an automatic musical performance of any selected piece from among the prepared plural pieces and exhibits on the display screen the musical score of the melody of the selected piece for practice. The musical score displayed in such a conventional apparatus is, for example, the one usually referred to as a tablature which includes indications as to the fret positions of the respective strings to depress.

With the apparatus of the above-mentioned conventional type, a student can conduct a practice of melody performance on the guitar reading a displayed tablature, and if preferred, also listeninventioning to the automatic performance of the practice piece of music. With such an apparatus, however, even if the student wants to practice the guitar playing in a desired fashion of practice such as an 8-beat rhythm study, the study piece of music displayed may not necessarily be the one suitable for the intended fashion of practice, thus an efficient practice may not be expected. Further, the conventional apparatuses are not equipped with a function of indicating particular manipulating manners including an up-stroke and a down-stroke, and the student will be perplexed which stroke to use for each tone rendition, which also will deteriorate the practice efficiency.

SUMMARY OF THE INVENTION

It is, therefore, a primary object of the present invention to provide a novel type of musical instrument practicing apparatus and method and a machine readable medium containing a program therefor capable of training the student in an efficient way.

According to the present invention, the object is accomplished by providing an apparatus for practicing a musical instrument comprising: a display device; a storage device which stores a plurality of music notation exhibiting information pieces defining a plurality of music notations to be displayed on the display device, the plurality of notations being correspondingly provided for a plurality of practice pieces of music in predetermined practice categories; a selecting device which selects one from the plurality of practice pieces of music; a read-out device which reads out a music notation exhibiting information piece which corresponds to the selected practice piece of music; and a display control device which causes the display device to display the music notation which corresponds to the selected practice piece of music based on the music notation exhibiting information piece read out by the read-out device.

With the apparatus of the preceding paragraph, the user or student who practices the musical instrument selects an arbitrarily desired practice music piece using the selecting device, and then the apparatus reads out the musical notation exhibiting information corresponding to the selected practice piece of music and the display device displays a music notation for practice based on the read-out musical notation exhibiting information. The user conducts practice of playing the musical instrument according to the displayed musical notation.

According to an aspect of the present invention, a musical instrument practicing apparatus comprises: a display device; a storage device which stores a plurality of music notation exhibiting information pieces defining a plurality of music notations to be displayed on the display device, the plurality of notations being correspondingly provided for a plurality of practice pieces of music in each of a plurality of practice categories; a first selecting device which selects one from the plurality of practice categories; a first display control device which causes the display device to display the plurality of practice pieces which meet the selected practice category; a second selecting device which selects one from the plurality of practice pieces of music displayed on the display device; a read-out device which reads out a music notation exhibiting information piece which corresponds to the selected practice piece of music; and a second display control device which causes the display device to display the music notation which corresponds to the selected practice piece of music based on the music notation exhibiting information piece read out by the read-out device.

With the apparatus of the preceding paragraph, the user or student who practices the musical instrument selects an arbitrarily desired practice music piece using the first selecting device, and then the display device displays a plurality of practice pieces of music within the selected practice category. Upon selection by the user of an arbitrarily desired practice piece from among the displayed practice pieces using the second selecting device, the apparatus reads out the musical notation exhibiting information corresponding to the selected practice piece of music and the display device displays a music notation for practice based on the read-out musical notation exhibiting information. The user conducts practice of playing the musical instrument according to the displayed musical notation.

In the apparatus of the second preceding paragraph, the storage device may store manipulating position information pieces, each indicating manipulating positions of the musical instrument to be practiced for each of a plurality of chords to be played on the musical instrument, the music notation exhibiting information pieces stored in the storage device may include chord information pieces, each indicating a chord to be practiced; the read-out device may read out a manipulating position information piece that indicates manipulating position of the musical instrument a chord represented by a chord information piece included in the music notation exhibiting information piece, every time one of the music notation exhibiting information piece is read out from the storage device; and the second display control device may cause the display device to exhibit the manipulating positions of the musical instrument for the chord to be played based on the manipulating position information piece read out from the storage device. With such a structure, where the practice categories are the practice on the rhythms of various beat styles, the chord information stored in the storage device can be used in common for plural practice categories.

According to another aspect of the present invention, an apparatus for practicing a musical instrument comprises: a display device; a first storage device which stores a plurality of music piece information pieces representing a plurality of music pieces, each of the plurality of music piece information pieces including practice category information pieces indicating practice categories for the music piece represented by the each music piece information piece; a second storage device which stores a plurality of music notation exhibiting information pieces defining a plurality of music notations to be displayed on the display device, the plurality of notations being correspondingly provided for a plurality of practice pieces of music in each of a plurality of practice categories; a first selecting device which selects one from the plurality of music pieces; a first display control device which refers to the practice category information pieces included in the music piece information piece representing the selected music piece and causes the display device to display the plurality of practice pieces which meet the practice category indicated by the practice category information pieces; a second selecting device which selectee one from the plurality of practice pieces of music displayed on the display device; a read-out device which reads out a music notation exhibiting information piece which corresponds to the selected practice piece of music; and a second display control device which causes the display device to display the music notation which corresponds to the selected practice piece of music based on the music notation exhibiting information piece read out by the read-out device.

With the apparatus of the preceding paragraph, the user or student who practices the musical instrument selects an arbitrarily desired music piece using the first selecting device, and then the apparatus refers to the practice category information included in the music piece information corresponding to the selected music piece and the display device displays a plurality of practice pieces of music within the selected practice category indicated by the referred-to practice category information. Upon selection by the user of an arbitrarily desired practice piece from among the displayed practice pieces using the second selecting device, the apparatus reads out the musical notation exhibiting information corresponding to the selected practice piece of music and the display device displays a music notation for practice based on the read-out musical notation exhibiting information. The user conducts practice of playing the musical instrument according to the displayed musical notation.

According to a further aspect of the present invention, an apparatus for practicing a musical instrument comprises: a display device; a storage device which stores music notation exhibiting information defining a music notation for practice and instrument manipulating manner information indicating manipulating manners for a musical instrument to be practiced; a read-out device which reads out from the storage device the music notation exhibiting information and the instrument manipulating manner information; and a display control device which causes the display device to display the music notation based on the music notation exhibiting information read out by the read-out device and the manipulating manners based on the instrument manipulating manner information read out by the read-out device.

With the apparatus of the preceding paragraph, the display device exhibits a music notation of a practice piece together with the indications of the manner of manipulating the musical instrument such as stroke directions for the strings. The user or student can conduct detailed practice of playing the musical instrument according to the displayed music notation and the manipulating manners.

As will be understood from the above description about the apparatus for practicing the musical instrument, a sequence of the steps each performing the operational function of each of the structural elements of the above musical instrument practicing apparatus will constitute a method for practicing the musical instrument according to the spirit of the present invention.

Therefore, according to the present invention, the object is further accomplished by providing a method for practicing a musical instrument comprising the steps of: storing in the storage device a plurality of music notation exhibiting information pieces defining a plurality of music notations to be displayed on the display device, the plurality of notations being correspondingly provided for a plurality of practice pieces of music in predetermined practice categories; selecting one from the plurality of practice pieces of music; reading out a music notation exhibiting information piece which corresponds to the selected practice piece of music; and causing the display device to display the music notation which corresponds to the selected practice piece of music based on the music notation exhibiting information piece read out by the step of reading out.

Further it will be understood from the above description about the apparatus and the method for practicing the musical instrument, a machine readable medium containing a program instructions executable by a computer system for executing a sequence of the processes each performing the operational function of each of the structural elements of the above musical instrument practicing apparatus or performing each of the steps constituting the above musical instrument practicing method will reside within the spirit of the present invention.

Therefore, according to the present invention, the object is still further accomplished by providing a machine readable medium for use in an apparatus for practicing the musical instrument, the apparatus being of a data processing type comprising a computer or of a system configured with a computer and also comprising a display device and a storage device, the medium containing program instructions executable by the computer for executing: a process of a process of storing in the storage device a plurality of music notation exhibiting information pieces defining a plurality of music notations to be displayed on the display device, the plurality of notations being correspondingly provided for a plurality of practice pieces of music in predetermined practice categories; a process of selecting one from the plurality of practice pieces of music; a process of reading out a music notation exhibiting information piece which corresponds to the selected practice piece of music; and a process of causing the display device to display the music notation which corresponds to the selected practice piece of music based on the music notation exhibiting information piece read out in the process of reading out.

BRIEF DESCRIPTION OF THE DRAWINGS

For a better understanding of the present invention, and to show how the same may be practiced and will work, reference will now be made, by way of example, to the accompanying drawings, in which.

DESCRIPTION OF THE PREFERRED EMBODIMENTS

Figure 1:
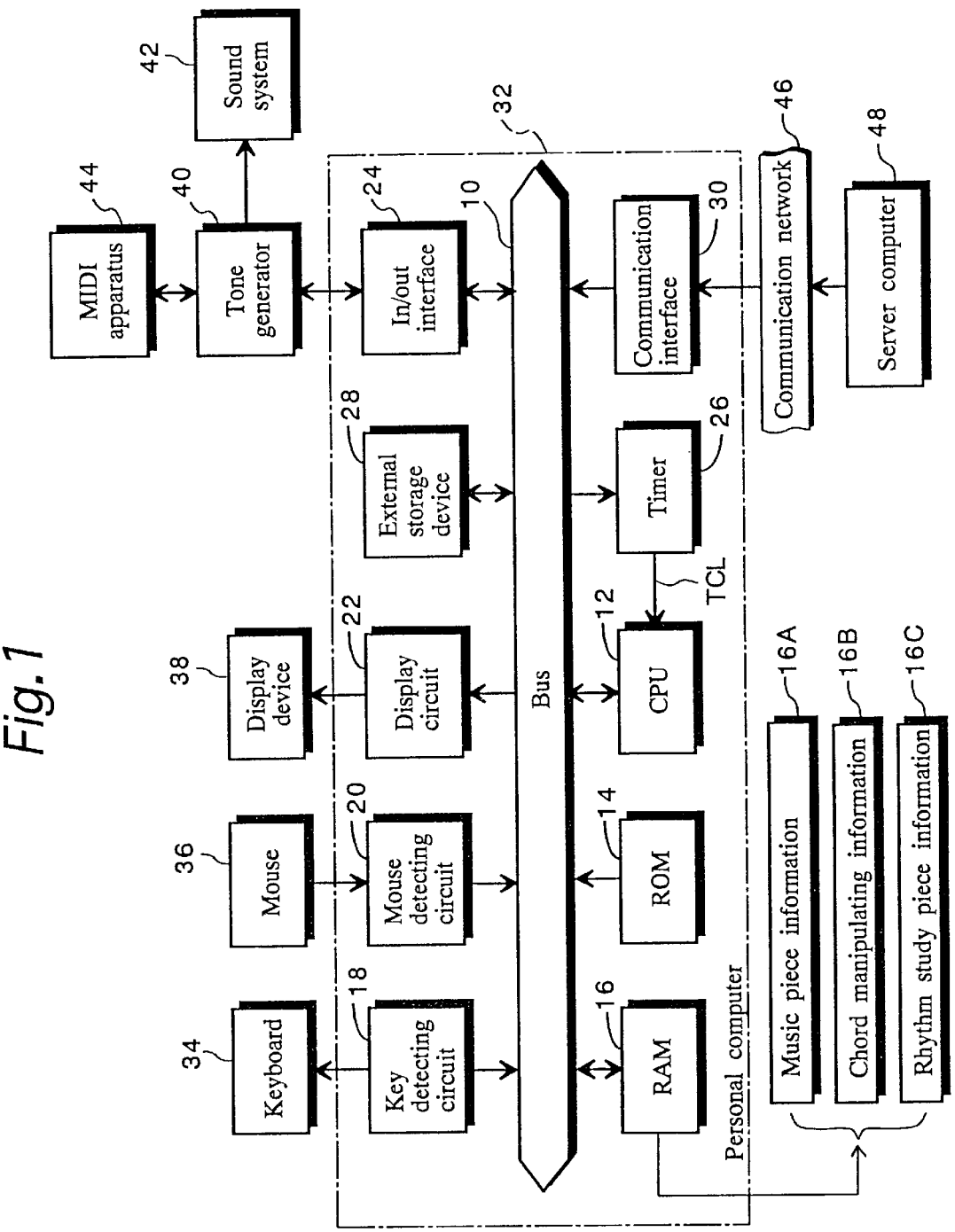
FIG. 1 is a block diagram showing an example of an electronic musical instrument embodying a musical instrument practicing apparatus according to the present invention.

As shown with a block diagram in FIG. 1, an example of an electronic musical instrument embodying a musical instrument practicing apparatus according to the present invention is of a type which generates musical tones according to a manual play on the instrument by an operator, generates musical tones for an automatic musical performance, displays a musical score, etc. and conducts associated operations under the control of a personal computer or small scale computer.

Connected to a bus 10 are a CPU (central processing unit) 12, a ROM (read only memory) 14, a RAM (random access memory)16, a key detecting circuit 18, a mouse detecting circuit 20, a display circuit 22, an input/output interface 24, a timer 26, an external storage device 28, and a communication interface 30, which (from 10 through 30) collectively constitute a personal computer 32 or system configured with a computer.

The CPU 12 executes various processings including displaying a musical score according to the programs stored in the ROM 14. The details thereof will be described herein later with reference to FIGS. 7–9. The ROM 14 stores, in addition to the programs, various information to be used for the automatic musical performance and the musical score display in the respective formats as will be described in detail hereinafter with reference to FIGS. 3–5. The RAM 16 includes various storage subdivisions (areas) to be accessed by the CPU 12 for various processings, wherein the primary ones may be a music piece information storing subdivision 16A, a chord manipulating information storing subdivision 16B and a rhythm study piece information storing subdivision 16C.

The key detecting circuit 18 is to detect the manipulated states of a keyboard 34. The keyboard 34 includes a musical keyboard section for designating notes to constitute a musical performance and an alphanumeric keyboard section for inputting alphanumeric characters. The mouse detecting circuit 20 is to detect the manipulation of a mouse 36. The mouse 36 is operated to move a cursor (not shown) on a display panel 38A (shown in FIG. 2) of a display device 38 and to click in a control instruction at the cursor position. The display circuit 22 controls the display device 38 for displaying various images on the panel 38A. Specific examples of the displayed image will be described herein later with reference to FIG. 2.

To the input/output interface 24 is connected a tone generator 40, which in turn is connected to a sound system 42 and a MIDI (musical instrument digital interface) apparatus 44. The tone generator 40 generates tone signals, which are fed to the sound system 42 to be converted into audible sounds.

The tone generator 40 includes a plurality of tone generation channels for generating plural tones simultaneously for a polyphonic performance. The types of the tone generating fashion may be arbitrarily employed from among the waveform memory type, the FM synthesis type, the physical model type, the harmonics synthesis type, the formant synthesis type, the analog synthesizer type including VCO's, VCF's, VCA's, etc. and any other types. The tone generator 40 may not be limited to a unique hardware device, but may be a combination of a DSP (digital signal processor) and a microprogram, or a combination of a CPU and a software program. The plurality of tone generating channels may be constructed by individual separate circuits of the number corresponding to the number of channels, or may be constructed by a single circuit operated in a time division multiplexed fashion.

To the tone generator 40 can be connected a MIDI apparatus 44, which may be an automatic music performing apparatus. The MIDI apparatus 44 inputs to the tone generator 40 performance information, etc., which information in turn can be loaded into the RAM 16 via the tone generator 40 and the input/output interface 24. The performance information and other information stored in the ROM 14, RAM 16 or the external storage device 28 can be supplied to the MIDI apparatus 44 via the input/output interface 24 and the tone generator 40.

The timer 26 is to generate a tempo clock signal TCL. The tempo clock signal TCL includes clock pulses generated at a period corresponding to the tempo set in accordance with tempo setting information which will be described later. The tempo clock signal TCL is supplied to the CPU 12 as an interrupt request signal. Upon receipt of each pulse of the tempo clock signal TCL, the CPU 12 executes an interrupt routine of FIG. 8. The interrupt routine will be described later.

The external storage device 28 is a storage device detachably including a storage medium or media of one or more types such as a hard disk (HD), a floppy disk (FD), a compact disk (CD), a digital versatile disk (DVD) and a magneto-optical disk (MO). When the external storage device 28 is equipped with a desired storage medium, the data in the storage medium can be transferred to the RAM 16. And where the equipped storage medium is of a writable type as an HD and an FD, the data in the RAM 16 can be transferred to such a storage medium. As the means for storing the programs, the storage medium (such as the above HD, FD, CD, DVD and MO) equipped in the external storage device may be used, in place of the ROM 14. In such situation, the program stored in the storage medium is transferred from the external storage device 28 to the RAM 16, and the CPU 12 is operated according to the thus transferred program as stored in the RAM 16. Such a configuration is advantageous in that an addition or an up-grading of the program will be easily made.

The communication interface 30 is provided to communicate with a server computer 48 via a communication network 46 such as a LAN (local area network), Internet and a telephone line. The programs and various data which are necessary for practicing the present invention may be downloaded into the RAM 16 or the external storage device 28 from the server computer 48 via the communication network 46 and the communication interface 30 with a down loading request.

In the above described electronic musical instrument, every time a key is depressed in the musical keyboard section in the keyboard 34, the CPU 12 supplies to the tone generator 40 a pitch information signal and a tone generation instructing signal corresponding to the depressed key. The tone generator 40 generates a musical tone signal having a pitch corresponding to the depressed key in response to the pitch information signal and the tone generation instruction signal. Thus, the tones for a manual musical performance are generated.

Figure 2:
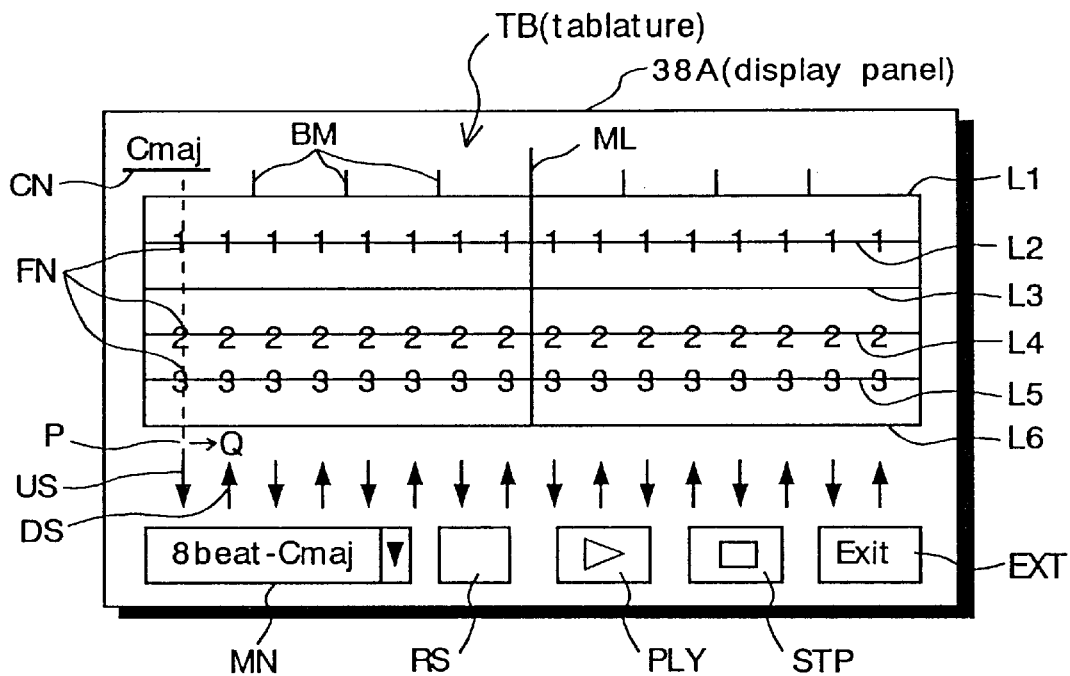
FIG. 2 is a chart showing how a tablature is exhibited on the display panel.

FIG. 2 is shows an example of a musical representation on the display device 38. The display panel 38A of the display device 38 exhibits a tablature TB for two measures as a practice music score (sheet music notation) together with a chord name label CN such as "Cmaj", a practice music piece name list box MN such as "8beat-Cmaj", a play back command button PLY, a stop command button STP, an exit command button EXT, a rhythm practice start command button RS, etc.

In the tablature TB, six horizontal lines L1 through L6 represents six strings of the guitar, wherein L1 indicates the first string and L6 indicates the sixth strong. A vertical line ML represents a measure line or bar line and short vertical lines BM are marks dividing one measure into four sections, each corresponding to one beat span in quadruple meter of 4/4. On the six string lines L1–L6 are placed fret numbers FN such as "1", "2" and "3" indicating the fret positions to depress on the respective strings, and in this example, such fret positions at each manipulating timing for the 8-beat performance, i.e. at each eighth note timing. A moving cursor mark P of a long vertical line across the string lines indicates the present moment of the running music and moves in the direction of an arrow Q as the music performance progresses. The example of the mark P shown in FIG. 2 is of a broken line, but may be of a solid line instead, or may be substituted by color changes of the fret numbers FN in accordance with the progression of the music. The tablature may not necessarily be limited to a two-measure chart, but may exhibit one measure or three measures or more, and can also exhibit music of other meter than 4/4 meter.

Under the tablature, downward arrows US and upward arrows DS are presented to indicate the up strokes and the down stroke of the instrument manipulating manners at the respective timings of an 8-beat music progression.

As will be understood from the illustration in FIG. 2, the student can practice the guitar in playing an 8-beat C major music piece (beat and chord practice) efficiently by looking at the tablature indications on the display panel and following guidance on the string and fret positions, the running moment of the music the stroke directions. As will be described later, a rhythm practice of other beats and chords than the 8-beat and the C major chord.

Figure 3:
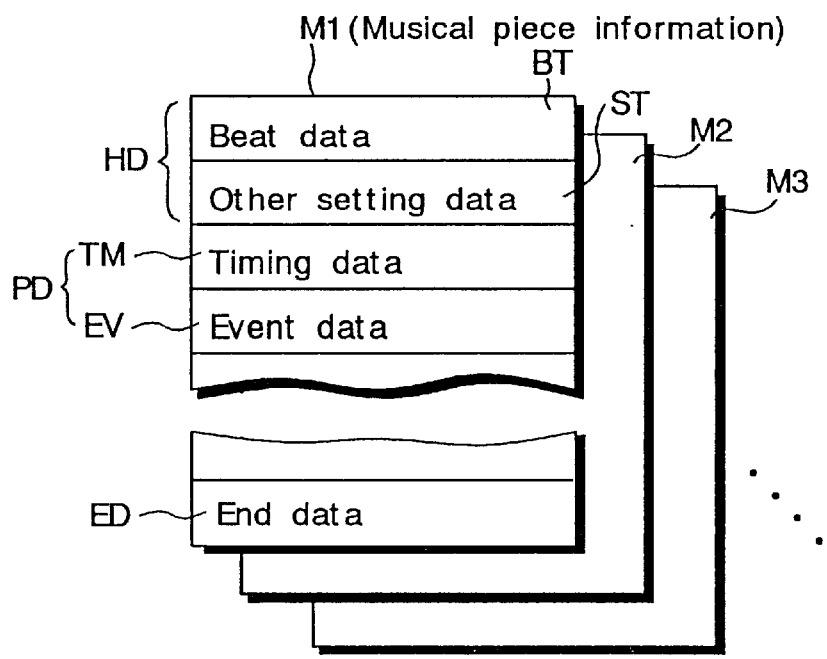
FIG. 3 is a chart showing a data storing format for musical piece information within the ROM.

FIG. 3 shows a data storing format for musical piece information within the ROM 14. The ROM 14 includes a first storage subdivision or area which stores a plurality of musical piece information pieces or units M1, M2, M3 (each information piece represents one music piece) and so forth for automatic performances corresponding to a plurality of musical pieces. Each of the musical piece information pieces includes, as exemplarily shown about the information piece M1, a head data block consisting of beat data BT and other setting data ST, and a number of performance data blocks PD aligned in sequence according to the progression of the performance. The beat data BT indicates a practice category of the rhythm selected from among the 8-beat rhythm practice, the 16-beat rhythm practice, the 2-beat rhythm practice, etc. The setting data includes information about the tempo, the meter, the key, the tone volume, the sound image localization, etc. Each performance data block PD includes timing data TM and event data EV. The timing data TM represents the generation timing of a tone in terms of a relative time as expressed in the time from the preceding event (more specifically, in terms of the number of pulse counts of the tempo clock signal TCL), and the event data EV represents the nature of an event in the performance such as a tone initiation (generation) and a tone termination (elimination). After a number of performance data blocks PD comes end data ED.

Figure 4:
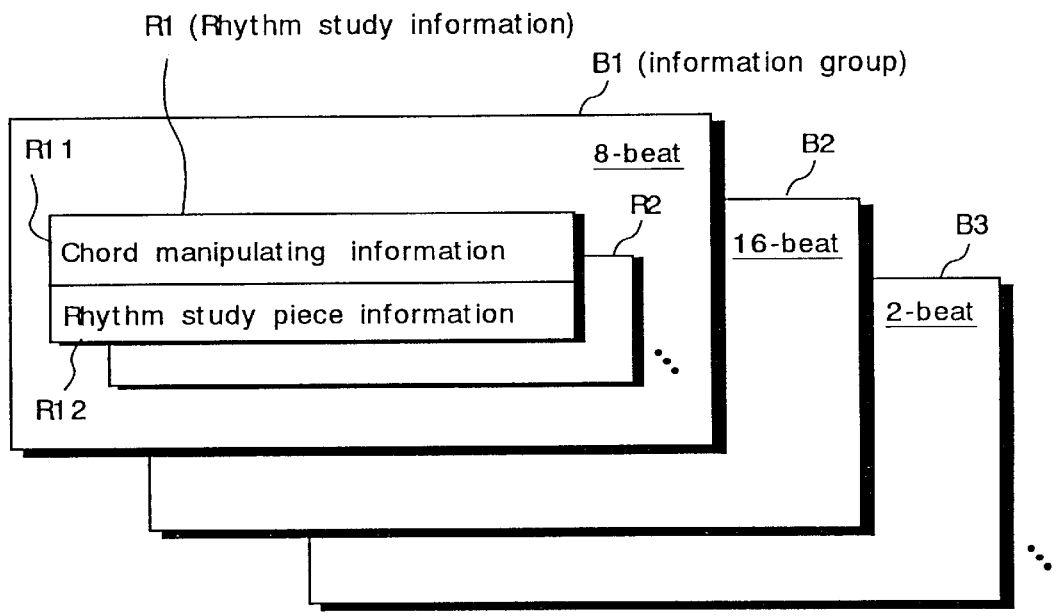
FIG. 4 is a chart showing a data storing format for rhythm study information within the ROM.

FIG. 4 shows a data storing format for rhythm study information within the ROM 14. The ROM 14 includes a second storage subdivision or area which stores a plurality of information groups B1, B2, B3 and so forth. The information group B1 includes a plurality of rhythm study (or practice) information blocks R1, R2 and so forth respectively corresponding to a plurality of rhythm study musical pieces which are suitable for training in rhythms and chords of 8-beat music, the information group B2 includes a plurality of rhythm study information pieces corresponding to a plurality of rhythm study musical pieces which are suitable for training in rhythms and chords of 16-beat music, and the information group B3 includes a plurality of rhythm study information pieces corresponding to a plurality of rhythm study musical pieces which are suitable for training in rhythms and chords of 2-beat music.

Each of the rhythm study information pieces includes, as exemplarily shown about the block R1, chord manipulating information R11 for the music score (sheet music) display and rhythm study piece information R12 for the automatic performance of a music piece for rhythm practice. The chord manipulating information R11 is of a format (A) in FIG.5 and includes a setting information piece S11 and a chord name data piece C11 followed by a number of manipulation data block SD11 aligned in sequence according to the performance progression of the music piece for rhythm practice. The setting information piece S11 includes setting data about the tempo, the meter, etc. The chord name information piece C11 indicates the name of the chord (for example, C major) to be practiced. Each manipulation data block SD11 includes timing data TM11 and stroke data A11. The timing data TM11 represents the beat timing of manipulation for a performance in terms of a relative time as expressed by the time from the preceding beat timing (more specifically, in terms of the number of pulse counts of the tempo clock signal TCL), and the stroke data A11 represents the direction of a stroke, i.e. either an up stroke or a down stroke. As an example, the chord manipulation information R11 sixteen pieces of timing data TM11 and sixteen pieces of stroke data A11 as the manipulation data blocks SD11 for two measures. Based on such chord manipulating information, a string-and-fret indication and a stroke indication are displayed in the tablature at each manipulation timing, as shown in FIG. 2. At the tail of the sequence of a plurality of manipulation data blocks SD11 is placed an end data piece ED11.

The rhythm study piece information R12 is musical performance information for automatically and repetitively performing the rhythm practice (study) piece of music consisting of two measures for which the above chord manipulating information R11 is also provided. The rhythm practice piece information R12 is of a format (B) in FIG. 5 and includes a setting information piece S12 followed by a number of performance data block PD12 aligned in sequence according to the musical performance progression. The setting information piece S12 includes setting data about the tempo, the meter, the tone color (timbre), tone volume (loudness), etc., wherein the tone color setting information includes guitar voice setting information. Each performance data block PD12 includes timing data TM12 and event data EV12. The timing data TM12 represents the tone generation timing for a performance in terms of a relative time as expressed by the time from the preceding event timing (more specifically, in terms of the number of pulse counts of the tempo clock signal TCL), and the event data EV12 represents various performance events including the initiation and the termination of each tone. As an example, when a triad chord of as C-E-G is to be generated, there are provided three event data pieces EV12 for one timing data piece TM12. At the tail of the sequence of a plurality of performance data blocks PD12 is placed an end data piece ED12.

Figure 6:
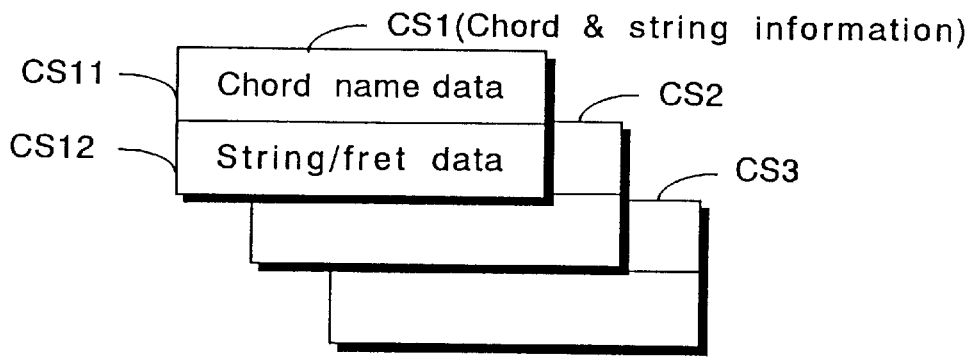
FIG. 6 is a chart showing a data storing format for chord and string information within the ROM.

FIG. 6 shows a data storing format for the chord-and-string information within the ROM 14. The ROM 14 includes a third storage subdivision or area which stores a plurality of chord-and-string information blocks (data blocks) CS1, CS2, CS3 and so forth for the displayed sheet music notation (score). Each of the chord-and-string information blocks includes, as exemplarily shown about the block CS1, a chord name data piece CS11 and a string/fret data piece CS12. The chord name data CS11 indicates a chord name (for example, C major) for practice. The string/fret data piece CS12 indicates the strings and the fret position of each string to be depressed for the performance of the chord indicated by the chord name data piece CS11. Among the chord-and-string information blocks CS1, CS2, CS3, etc., the respective chord names expressed by the chord name data are different from each other, for example, as C major, C minor, C seventh, and so forth. The chord and string information block CS1, CS2, CS3, etc. are commonly used for the information groups B1, B2, B3, etc. of FIG. 4 in displaying a sheet music notation (score).

Figure 7:
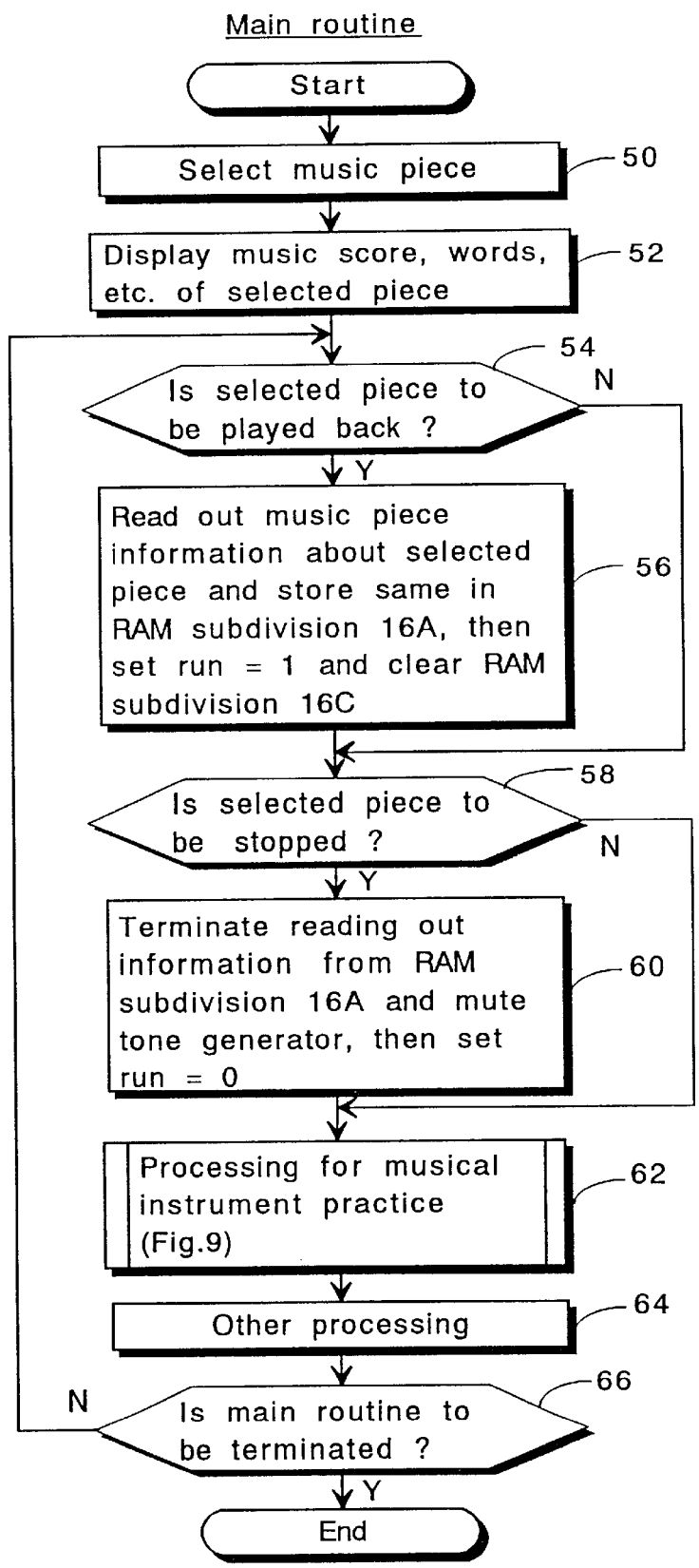
FIG. 7 is a flow chart showing the main routine of the processing for training the student in playing the musical instrument.

FIG. 7 is shows a processing flow of the main routine for the practice of the musical instrument. The main routine starts upon selection of the practice mode.

A step 50 is a process for selecting a music piece for practice. The display device 38 displays on its panel 38A (FIG. 2) a plurality of music piece names of the corresponding plurality of musical piece information pieces stored in the first subdivision of the ROM 14, and waits for selection by the student. According to the mouse operation (positioning the cursor and clicking) by the user on a desired music piece name, the music piece having the designated name is selected. A step 52 displays on the display panel 8A the title (music piece name), the tablature, the words, the chord progression, etc. of the selected musical piece.

A step 54 judges whether the selected musical piece is to be played back. When the mouse is clicked with the mouse pointer on the play back button PLY in the display panel 38A, the judgment at the step 54 rules affirmative (Y) and the process moves forward to a step 56. The step 56 reads out the musical piece information corresponding to the selected music piece for practice from the first storage subdivision of the ROM 14 and sets (stores) it in the storage subdivision 16A of the RAM 16. Further, a flag "run" which indicates that an automatic performance is "on" is set at a value "1" and the storage subdivision 16C of the RAM 16 is cleared here. This is a preparatory process for the automatic performance of the selected music piece, before the interrupt routine of FIG. 8 initiates the automatic performance. Used for the flag "run" is a predetermined memory area in the RAM 16.

When the judgment result at the step 54 is negative (N), or when the processing at the step 56 is over, the process moves to a step 58 to judge whether the performance of the selected music piece is to be stopped. If the mouse is clicked with the mouse pointer on the stop button STP exhibited in the display panel 38A, the judgment answer at the step 58 becomes affirmative (Y) and the process moves forward to a step 60. The step 60 terminates reading out the music piece information from the RAM subdivision 16A and conducts a muting process on the tone generator 40. The muting process is a process to start the decay or extinction of the tone signal being generated. The flag "run" is set at a value "0" here, too. When the judgment answer at the step 58 is negative (N), or when the processing at the step 60 is over, the process moves to a step 62 to conduct processing for practicing the musical instrument play which will be described in detail later with reference to FIG. 9. Thereafter, the process moves to a step 64.

The step 64 is for various other processing. The processing includes alteration of the music piece, the tempo, the key, etc. After this step 64, a step 66 judges whether the main routine processing is to be terminated. So long as the exit button EXT displayed in the display panel 38A is not clicked with the mouse, the judgment result at the step 66 is negative (N), and then the process goes back to the step 54 to repeat the process flow therefrom in the same manner as described hereinabove. When the exit button EXT is clicked with the mouse, the step 66 judges affirmative (Y) and the main routine process flow comes to its end.

Figure 8:
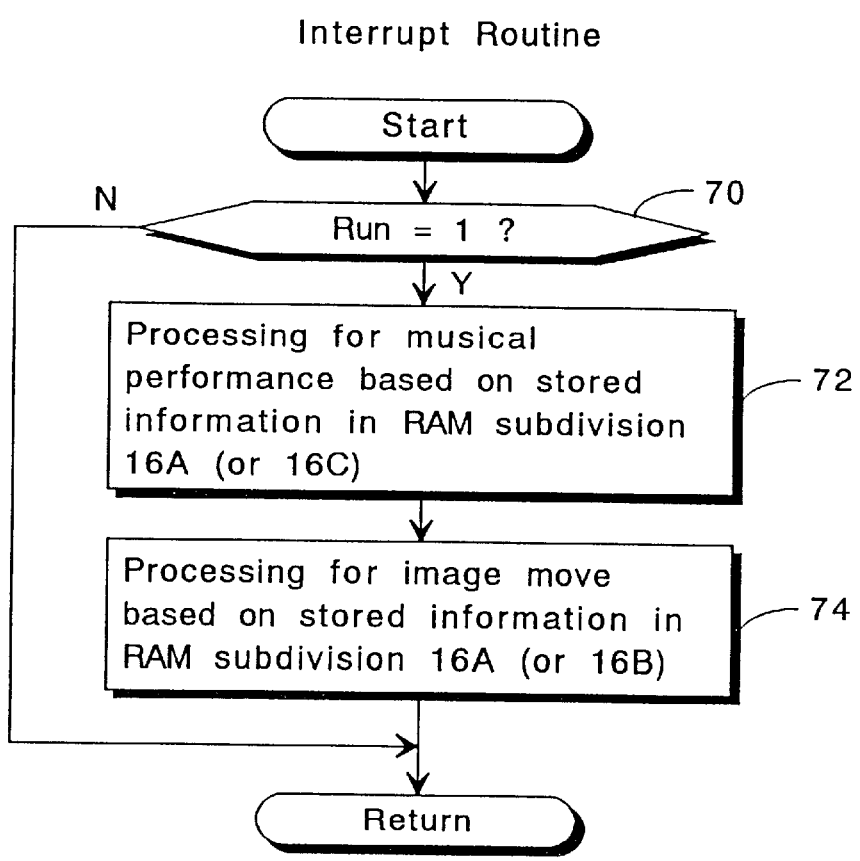
FIG. 8 is a flow chart showing an interrupt routine for an automatic accompaniment performance.

FIG. 8 shows a processing flow of the interrupt routine for an automatic accompaniment performance, which routine starts every time a clock pulse of the tempo clock signal TCL is given. A step 70 judges whether the flag "run" is "1". If the judgment answer is affirmative (Y), it means that the automatic performance is running, and the process go forward to a step 72. If the judgment answer is negative (N), it means that the automatic performance is not running, and the process returns to the main routine.

The step 72 conducts performance processing based on the information stored in the storage subdivision 16A. The timing data (this corresponds to TM in FIG. 4) is read out from the storage subdivision 16A, and a judgment is made as to whether the clock value indicated by the read-out timing data is identical with the count value of the clock counter. When the judgment rules affirmative, the event data (this corresponds to EV in FIG. 4) which is paired with the read-out timing data is supplied to the tone generator 40 to generate a tone signal corresponding to the event data. The clock counter is to count the clock pulses of the tempo clock signal TCL. A predetermined memory area in the RAM 16 is used for the clock counter.

Next, a step 74 conducts processing for image move based on the information stored in the storage subdivision 16A. Namely, the image or picture of the sheet music notation (musical score) or tablature, the words, etc. displayed at the above-mentioned step 52 are moved corresponding to the performance progression. After the process at the step 74, the processing returns to the routine of FIG. 7 to resume the main routine processing.

Figure 9:
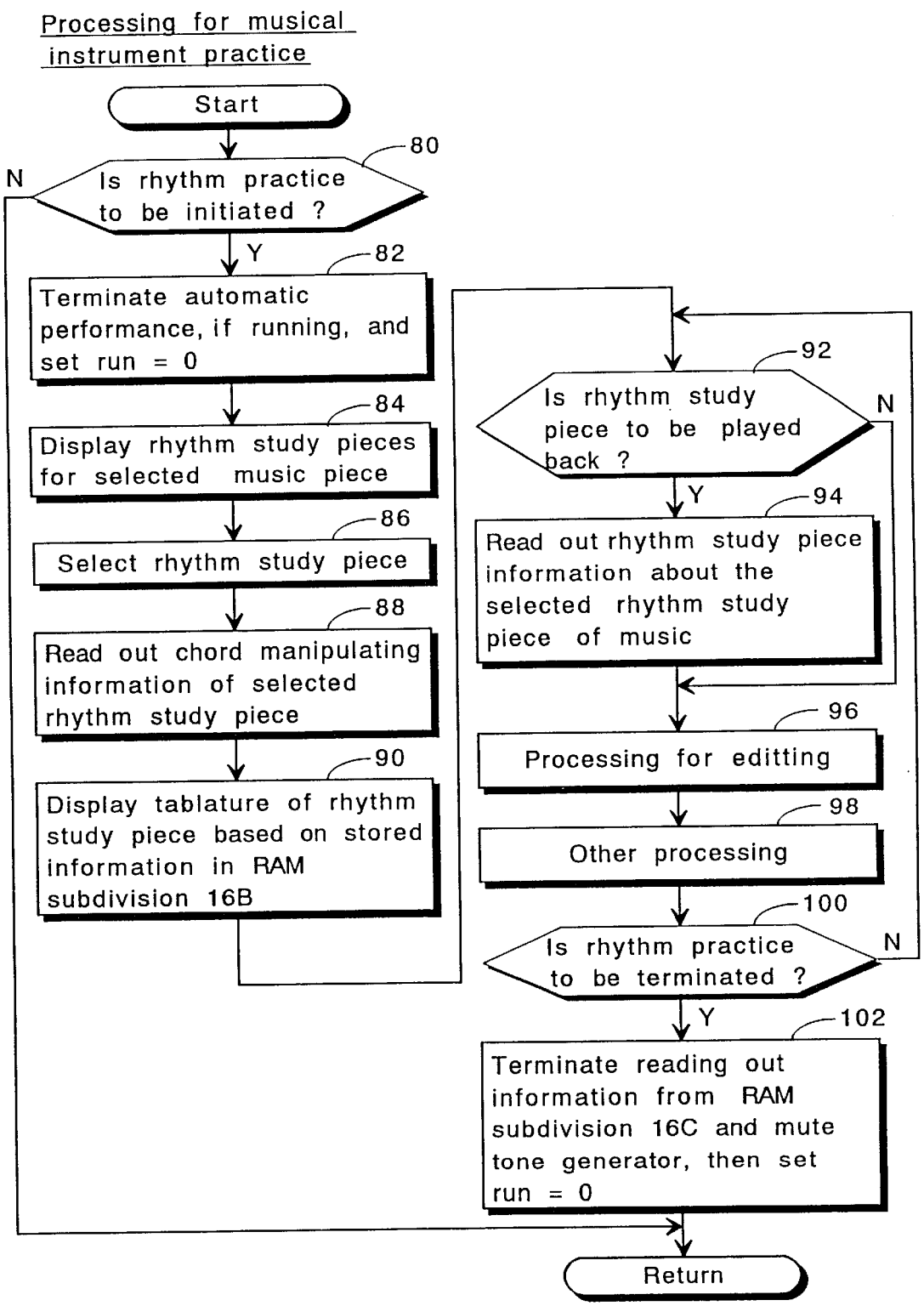
FIG. 9 is a flow chart showing a subroutine of the processing for the practice of playing the musical instrument as conducted at step 62 of FIG. 7.

FIG. 9 shows a subroutine of the processing for the practice of playing the musical instrument as conducted at the step 62 of FIG. 7. A step 80 judges whether a rhythm practice is to be initiated. When the mouse is clicked with the pointer pointing at the rhythm practice start command button RS displayed on the display panel 38A, the step 80 judges affirmative (Y) and the process moves forward to a step 82. If no mouse clicking is made with respect to the rhythm practice start button RS, the step 80 judges negative (N) and the processing returns to the main routine of FIG. 7.

A step 82 sets a value "0" into the flag "run" to terminate the automatic performance of a music piece, if any. In this embodiment, the student may simply click the mouse with a pointer at the rhythm practice start command button RS to change to a rhythm practice mode even amidst the automatic performance of a musical piece running, and such a mode change automatically stops the automatic performance without the need of clicking the mouse on the stop command button STP. This eliminates one mouse operation at the user's end and facilitates a smooth transfer to the rhythm practice.

Next at a step 84, a plurality of rhythm practice pieces are displayed on the display panel 38A corresponding to the selected piece. In this processing, the program refers to the beat data the musical piece information stored in the storage subdivision 16A, and displays a plurality of rhythm study pieces which are adequate for the rhythm practice of the beat designated by the beat data BT. For example, in the case where the beat data BT indicates the rhythm practice in the 8-beat rhythm, titles of a plurality of rhythm study pieces that belongs to the information group B1 of 8-beat music are displayed for the user's selection from among the information groups B1–B3 stored in the second storage subdivision of the ROM14. Thus, the user can easily select a rhythm study piece which is suitable for the selected musical piece (tune or song) which the user wants to master.

Next, a stop 86 is the processing of rhythm study piece selection. Namely, as the user clicks the mouse at any arbitrary one among a plurality of rhythm study pieces displayed on the display panel 38A, the mouse-clicked rhythm study piece will be selected. Then, the process goes to a step 88.

The step 88 reads out the chord manipulating information piece (e.g. R11 in FIG. 4) within the rhythm study information (e.g. R1 in FIG. 4) corresponding to the selected study practice piece from the second storage subdivision of the ROM 14, and sew (stores) the read-out information piece into the storage subdivision 16B of the RAM 16. And then, a step 90 displays on the display panel 38A the tablature TB of the rhythm study piece as illustrated in FIG. 2 based on the chord manipulating information piece in the storage subdivision 16B.

For displaying the practicing picture on the screen, the processing step refers to chord name data (corresponding to C11 in FIG. 5) in the chord manipulating information piece (R11), reads out from the third storage subdivision of the ROM 14 string/fret data (for example, CS12 in FIG. 6) which is paired with the chord name data (for example, CS 11 in FIG. 6) indicating the same chord name as the above former chord name data (C11), and indicates the string(s) and the fret(s) to depress by fret number(s) at every instrument manipulating timing. Further, a stroke instruction either of the upstroke or the down stroke is also displayed using an arrow US or DS at every instrument manipulating timing based on the stroke data (corresponding to A11 in FIG. 5) in the chord manipulating information piece (R11). Further, the chord name CN, the practice music piece name MN, the current progressing position mark P of a moving cursor, and so forth.

Next, a step judges whether the rhythm study piece is to be played back or not. When the user clicks the mouse at the play back command button PLY displayed on the display panel 38A, the judgment answer at the step 92 becomes affirmative (Y), and the process proceeds to a step 94.

The step 94 reads out the rhythm study piece information corresponding to the selected rhythm study music piece from the second storage subdivision of the ROM 14, and sets (stores). the same into the storage subdivision 16C of the RAM 16. The step also sets a value "1" into the flag "run" and clears the storage subdivision 16A of the RAM 16. This is a preparatory processing for automatically performing the selected rhythm practice piece, and the automatic performance will take place by the interrupt routine of FIG. 8 as described herein later.

When the judgment answer at the step 92 is negative (N), or when the processing of the step 94 is over, the process flow proceeds to a step 96. The step 96 conducts processing for editing the rhythm study information. As any alteration such as an addition and a deletion is made on the chord Manipulating information in the storage subdivision 16B, the corresponding rhythm study piece information in the storage subdivision 16C is altered accordingly. Conversely, if an addition or a deletion is made with respect to the rhythm study piece information in the storage 16C, then the chord manipulating information in the storage subdivision 16B is altered accordingly. For the purpose of editing work, the alphanumeric character section of the keyboard 34 may be used other than the mouse 36.

A step 98 is for other processing including suit as changing rhythm practice pieces or tempos.

A step 100 judges whether the rhythm practice is to be finished. So long as the stop command button STP displayed in the display panel 38A is not mouse-clicked, the judgment at the step 100 remains negative (N), which directs the process flow back to the step 92 to repeat the processing of the step 92 and so forth as described hereinabove. When the stop command button STP is mouse clicked, the judgment at the step 100 turns out to be affirmative (Y) and the process flow moves forward to a step 102. The step 102 terminates reading out the rhythm study piece information from the RAM subdivision 16C and mutes the tone generator 40. And then the flag "run" is set to be "0". Then, the process flow returns to the main routine of FIG. 7.

During the time the processing at the steps 92–100 is performed, the flag "run" is set at "1", and therefore the processing of the steps 72 and 74 takes place. Namely, the step 72 conducts the processing for the musical performance based on the stored information in the RAM subdivision 16C. As the sub division 16C stores the rhythm study piece information owing to the step 94, the selected rhythm study piece is played in an automatic performance based on the stored rhythm study piece information. The manner of operation for generating tone signals is the same as described above in connection with the automatic performance of the music piece, and in the case where one Chug data piece is combined with three event data pieces as a set, three tone signals corresponding to the three event data pieces simultaneously.

The step 74 conducts the processing for image move based on the stored information in the RAM sub division 16B. As the subdivision 16B stores the chord manipulating information owing to the step 88, the mark P indicates the current progressing position of the performance based on the timing data included in the stored chord manipulating information. As a result, the mark P moves in the direction of the arrow Q in accordance with the progression of the music performance.

Figure 5:
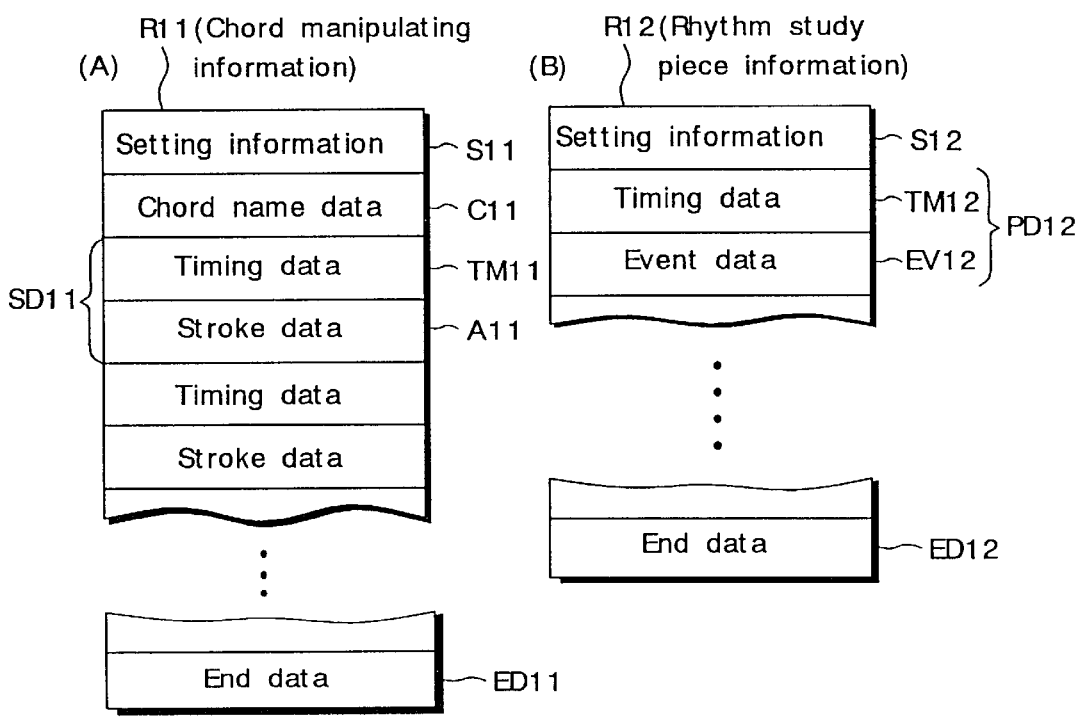
FIG. 5 is a chart showing data storing formats for chord manipulating information and rhythm study piece information, respectively, as included in the rhythm study information of FIG. 4.

The automatic performance of the rhythm study piece by the step 72 is conducted in a manner that the performance restarts from the top of the first measure in response to read-out of the end data ED 12 of FIG. 5, thus repeating the performance of the two measures. The indication of the current position of the music progression by the mark P is also repeated corresponding to the repetition of the music performance.

With the above described embodiment of the present invention, as the user selects an arbitrary music piece, a tablature of that selected music piece is displayed on the panel, and the user can practice the guitar in playing the displayed music piece according to the tablature. If, in this case, the play back of the music is commanded, the user can hear the automatic performance of the selected music piece. And upon instruction of initiating rhythm practice, there will be displayed on the panel a plurality of rhythm study pieces having a same beat style as the selected music piece. As the user selects an arbitrary one among the displayed plural rhythm study pieces, a tablature corresponding to the selected rhythm study piece is displayed on the screen together with the stroke indication. If the user designates the play back of the rhythm study piece under this circumstance, the player can bear the automatic performance, of the selected rhythm study piece. Thus, the user can practice in a guitar efficiently by watching the tablature with the stroke indication and also by listening to the performance demonstration of the rhythm practice music piece.

Although, some specific examples of the present invention have been described above, this invention may not be limited to those examples described but may be variously modified to perform the contemplated functions without departing from the spirit of the present invention. Examples of such a modification will be as follows.

(1) The stroke indication marks may not necessarily be limited to arrows, but may be of other figures or descriptive characters such as "UP" and "DOWN".

(2) The displayed musical notation for-practice may not necessarily be limited to a tablature, but may be of other fashions such as the usual notes and rests representation on the five-line stave. The stroke indication marks be incorporated is such a notation as in the case of the violin score.

(3) In indicating the stroke or other manners of manipulation on the display, there may be added some information indicating the string identification. For example, in addition to, the indication of the up stroke or the down stroke, the number of the string to be stroked may be exhibited in the screen.

(4) The practicing category may not be limited to a rhythm practice for various beat styles, but may be a chord practice including various chord types (major, minor, seventh, etc.), a practice in various effects inclusion (tremolo vibrato etc.).

(5) The chord manipulating information and the rhythm study piece may not be necessarily stored separately as shown in FIG. 5, but may be stored in an intermingled fashion.

(6) The chord manipulating information and the rhythm study piece information may not necessarily be stored beforehand in the ROM as shown in FIG. 5, but only either one may be provided beforehand and the other may be created automatically based on the stored one using an adequate algorithm.

(7) The string/fret data (CS12 of FIG. 6) maybe stored within the chord manipulating information in place of the chord name data (C11 of FIG. 5).

(8) The present invention in applicable and practicable, where the musical piece information does not include practicing category information. In such an alternative, for example, three practicing categories (points) may be displayed for the user's selection corresponding to the information groups B1–B3 of FIG. 4 in response to the music piece selection, and a plurality of practice pieces of music which meet the selected practice category (for example, the one that corresponds to the information group B1) may be displayed, as the user selects arbitrary one form among the three displayed practice categories. Instead of displaying all the practice categories in response to the music piece selection, the practice category indication may be conducted in the manners: (a) to display the practice category of which the musical parameters (e.g. key and meter) coincide with those of the selected music piece in response to the music piece selection; and (b) to display a predetermined practice category in accordance with the music piece selection.

(9) This invention is applicable and practicable in the case where the display of the practice categories are not interrelated with the selection of the music pieces. In such a situation, the display may exhibit a plurality of practice categories the user may select an arbitrary one from among the displayed practice categories, and then the display may exhibit a plurality of practice pieces of music which will meet the selected practice category.

(10) The present invention may be practiced, not only in the form of an electronic musical instrument, but also in the form of a combination of a personal computer and application software. The application software may be stored in a magnetic disk, a magneto-optical disk, a semiconductor memory, etc. to be supplied to the personal computer, or may be supplied to a personal computer from an external data base via a communication network.

(11) The present invention is applicable, not only to the practice of the string musical instrument including the guitar, but also to the practice of the keyboard musical instrument, the wind musical instrument and the percussion musical instrument.

(12) The present invention is applicable, not only to an electrode musical instrument including the guitar, but also to the practice of the keyboard musical instrument, the wind musical instrument and the percussion musical instrument.

(12) The present invention is applicable, not only to an electronic musical instrument comprising therein a tone generator, an automatic performance device, etc., but also to an electronic musical instrument system as configured by combining by a keyboard device, a tone generator device, an automatic music performing device, etc. with communication means such as MIDI cables and other various networks.

(13) The formats for the music piece information and the practice piece information may not be limited to the "event+relative time" style in which time point of each event is expressed in relative times counted from each preceding event, but may also be the "event+absolute time" style in which the time points of the events are expressed in absolute times counted from the top of the music or each measure, or may be the "pitch (rest)+ duration" style in which the music progression expressed by note pitches and note durations, and rests and rest durations, or may be the "event map" style in which memory addresses are previously assigned for all the time points in the musical progression and each event content is stored at the assigned address for that time point. Any other arbitrary style may be employed.

(14) The selection of the music piece, the practice category and the practice piece, and the designation of the play back of the music piece and the start of the rhythm practice may be conducted, not only by mouse operations, but also by alphanumeric key operations in the keyboard 34.

According to the present invention, therefore, as the user selects an arbitrary one from among a plurality of practice pieces of music which meet the desired practice category or practice points, the apparatus displays a music notation picture or score for practice corresponding to the selected music piece, and therefore the user can conduct the intended practice of playing the musical instrument in the desired practice point smoothly according to the displayed practice music notation corresponding to the desired practice music piece thereby enjoying an efficient practice to improve the performance skill. In addition to the above general merit, the present invention has further advantageous features as follows.

(1) As an arbitrary practice point is selectable from among a plurality of practice points, the user can conduct a practice in various points. If, in this case, the apparatus is constructed such that the chord manipulating position information for a plurality of chords are used in common with a plurality of practice categories, the memory capacity would be made less as compared with the situation in which chord manipulating position information is provided for every music notation displaying information.

(2) As a plurality of music pieces which meet the practice categories corresponding to the selected music piece in response to the user's music piece selection, and as an arbitrary one can be selected from among the displayed plurality of practice pieces, the user can easily select an efficient practice piece for the intended music piece with which the user wants to practice the musical instrument.

(3) As the stroke indications are included in the displayed guidance, the user can master the correct manipulation or playing manner of the musical instrument under practice.

While several forms of the invention have been shown and described, other forms will be apparent to those skilled in the art without departing from the spirit of the invention. Therefore, it will be understood that the embodiments shown in the drawings and described above are merely for illustrative purposes, and are not intended to limit the scope of the invention, which is defined by the appended claims.

What is claimed is:

1. An apparatus for practicing a musical instrument comprising:
   a display device;
   a first storage device which stores a plurality of music piece information pieces representing a plurality of music pieces, each of said plurality of music piece information pieces including a practice category information piece indicating a practice category for the music piece by said each music piece information piece;
   a second storage device which stores a plurality of practice piece information pieces representing a plurality of practice pieces of music per practice category, each of said plurality of practice piece information pieces including a music notation exhibiting information piece defining music notations to be displayed on said display device to exhibit said each practice piece of music;
   a selecting device which selects one from said plurality of music pieces; and
   a display control device which refers to said practice category information piece included in the music piece information piece representing said selected music piece and causes said display device to display said plurality of practice pieces of music which meet the practice category indicated by said practice category information piece.

2. An apparatus according to claim 1, wherein said selecting device is a first selecting device and said display control device is a first display control device, said apparatus further comprising:
   a second selecting device which selects one form said plurality of practice pieces of music displayed on said display device;
   a read-out device which reads out a music notation exhibiting information piece which corresponds to said selected practice piece of music; and
   a second display control device which causes said display device to display said music notations exhibiting said selected practice piece of music based on said music notation exhibiting information piece read out be said read-out device.

3. An apparatus according to claim 2, wherein:
   said second storage device stores manipulating position information pieces, each indicating manipulating positions of the musical instrument to be practiced for each of a plurality of chords to be played on the musical instrument, and said music notation exhibiting information pieces stored in said second storage device includes chord information pieces, each indication a chord to be practiced;
   said read-out device reads out a manipulating position information piece that indicates manipulating position of the musical instrument for a chord represented by a chord information piece included in said music notation exhibiting information piece, every time one of said music notation exhibiting information piece is read out from said second storage device; and
   said second display control device causes said display device to exhibit the manipulating positions of the musical instrument for the chord to be played based on said manipulating position information piece read out from said second storage device.

4. An apparatus for practicing a musical instrument comprising:
   a display device;
   a storage device which stores music notation exhibiting information defining music notations for practice and instrument manipulating manner information indicated manipulating manners in terms of up strokes and down strokes for a musical instrument to be practiced;
   a read-out device which reads out from said storage device said music notation exhibiting information and said instrument manipulating manners information; and
   a display control device which causes said display device to display said music notations based on said music notation exhibiting information read out by said read-out device and said manipulating manners in terms of up strokes and down strokes based on said instrument manipulating manner information read out by said read-out device.

5. An apparatus according to claim 4, wherein said music notation includes note events constituting a progression of music and said manipulating manners are indications of up strokes and down strokes for the respective note events.

6. A method for practicing a musical instrument comprising the steps of:

storing in a storage device a plurality of music piece information pieces representing a plurality of music pieces, each of said plurality of music piece information pieces including a practice category information piece indicating a practice category for the music piece represented by said music piece information piece;

storing in said storage device a plurality of practice piece information pieces representing a plurality of practice pieces of music per practice category, each of said plurality of practice piece information pieces include a music notation exhibiting information piece defining music notations to be displayed on a display device to exhibit said each practice piece of music;

selecting one from said plurality of music pieces; and referring to said practice category information piece included in the music piece information piece representing said selected music piece and displaying on a display device said plurality of practice pieces of music meet the practice category indicated by said practice category information piece.

7. A method according to claim 6, further comprising the steps of:

selecting one from said plurality of practice pieces of music displayed on said display device;

reading out a music notation exhibiting information piece which corresponds to said selected piece of music; and displaying on said display device said music notations exhibiting said selected practice piece of music based on said music notation exhibiting information piece read out by said step of reading out.

8. A method for practicing a musical instrument comprising the steps of:

storing in a storage device music notation exhibiting information defining music notations for practice and instrument manipulating manner information indicating manipulating manners in terms of up strokes and down strokes for a musical instrument to be practiced;

reading out from said storage device said music notation exhibiting information and said instrument manipulating manner information; and displaying on a display device said music notations based on said music notation exhibiting information read out in said step of reading out and said manipulating manners based on said instrument manipulating manner information read out by said step of reading out.

9. A machine readable medium for use in an apparatus for practicing a musical instrument, said apparatus being of a data processing type comprising a computer, a display device and a storage device, said medium containing program instructions executable by said computer for executing:

a process of storing in said storage device a plurality of music piece information pieces representing a plurality of music pieces each of said plurality of music piece information pieces including a practice category information piece indicating a practice category for the music piece represented by said each music piece information piece;

a process of storing in said storage device a plurality of practice piece information pieces representing a plurality of pieces of music per practice category, each of said plurality of practice piece information pieces including a music notation exhibiting information piece defining music notations to be displayed on said display device to exhibit said each practice piece of music;

a process of selecting one from said plurality of music pieces; and a process of referring to said practice category information piece included in the music piece information piece representing said elected music piece and causing said display device to display said plurality of practice pieces of music which meet the practice category indicated by said practice category information piece.

10. A Machine readable medium according to claim 9, further containing program instructions executable by said computer for executing:

a process of selecting one from said plurality of practice pieces of music displayed on said display device;

a process of reading out a music notation exhibiting information piece which corresponds to said selected practice piece of music; and a process of causing said display device to display said music notations which represent said selected practice piece of music based on said music notation exhibiting information piece read out in said process of reading out.

11. An apparatus for practicing a musical instrument comprising:

a display device;

storage means for storing a plurality of music piece information pieces representing a plurality of music pieces, each of said plurality of music piece information pieces including a practice category information piece indicating a practice category for the music piece represented by said each music piece information piece, and for storing a plurality of practice piece information pieces representing a plurality of practice pieces of music per practice category, each of said plurality of practice piece information pieces including a music notation exhibiting information piece defining music notations to be displayed on said display device to exhibit said each practice piece of music;

selecting means for selecting one from said plurality of music pieces; and display control means for referring to said practice category information piece included in the music piece information piece representing said selected music piece and for causing said display device to display said plurality of practice pieces of music which meet the practice category indicated by said practice category information piece.

* * * * *